United States Patent [19]

Gore

[11] Patent Number: 5,308,510
[45] Date of Patent: May 3, 1994

[54] OIL SPILL SKIMMER AND PROCESSOR

[76] Inventor: Douglas J. Gore, 5168 Brookside La., Concord, Calif. 94521

[21] Appl. No.: 935,454

[22] Filed: Aug. 25, 1992

Related U.S. Application Data

[63] Continuation of Ser. No. 663,720, Mar. 4, 1991.

[51] Int. Cl.$^5$ ............................................. E02B 15/04
[52] U.S. Cl. ................................. 210/776; 210/122; 210/242.3; 210/923
[58] Field of Search ............... 210/122, 242.1, 242.3, 210/253, 257.1, 259, 521, 923, 219, 776, 195.1

[56] References Cited

U.S. PATENT DOCUMENTS

| | | | |
|---|---|---|---|
| 3,219,190 | 11/1965 | Thune | 210/242.3 |
| 3,529,720 | 9/1970 | Chablaix | 210/242.3 |
| 3,615,017 | 10/1971 | Valdespino | 210/923 |
| 3,700,108 | 10/1972 | Richards | 210/923 |
| 3,708,070 | 1/1973 | Bell | 210/242.3 |
| 3,862,904 | 1/1975 | Weatherford | 210/923 |
| 4,049,554 | 9/1977 | Ayers | 210/923 |
| 4,100,072 | 7/1978 | Uchida et al. | 210/242.3 |
| 4,128,068 | 12/1978 | Ogura et al. | 210/242.3 |
| 4,316,806 | 2/1982 | Canevari | 210/923 |
| 4,372,854 | 2/1983 | Szereday | 210/923 |
| 4,425,240 | 1/1984 | Johnson | 210/923 |
| 4,456,536 | 6/1984 | Lorenz et al. | 210/923 |
| 4,487,694 | 12/1984 | Brandt et al. | 210/242.3 |
| 4,511,470 | 4/1985 | Ayroldi | 210/242.3 |
| 4,851,133 | 7/1989 | Rymal | 210/242.3 |
| 5,043,065 | 8/1991 | Propp | 210/923 |

FOREIGN PATENT DOCUMENTS 2249898 4/1974 Fed. Rep. of Germany .
2152295 4/1973 France .

Primary Examiner—Christopher Upton
Attorney, Agent, or Firm—Thomas M. Freiburger

[57] ABSTRACT

An oil spill skimmer and processor particularly for offshore oil spill recovery includes a series of features which enable efficient recovery of oil from the water surface, even in the presence of considerable debris. Controllable water jets move the oil generally by means of a mound at the water surface, entrapping air which rises and moves the water outwardly. Debris can be steered away by the use of a water jet on one side of the inlet to the apparatus. A further water jet adjacent to a front weir of the skimmer system enables cleaning of debris from the weir itself. Preferably a nozzle is included at the back of the apparatus for the introduction of chemicals into the oil. Further, the apparatus enables the operator to reverse either of two internal pumps to flutter weirs up and down for the clearing of debris. A debris grid or grate at the inlet of the skimmer apparatus traps debris, and a grinder receives trapped debris from the grate. Ground up debris is passed on with the recovered oil. The apparatus further includes fore and aft ballast tanks with ballast control, for adjustment of the attitude of the vessel to compensate for waves. The system includes controls allowing shifting of the operating positions of the front and rear weirs. Baffles are included near a front sump to assist in oil/water separation.

20 Claims, 7 Drawing Sheets

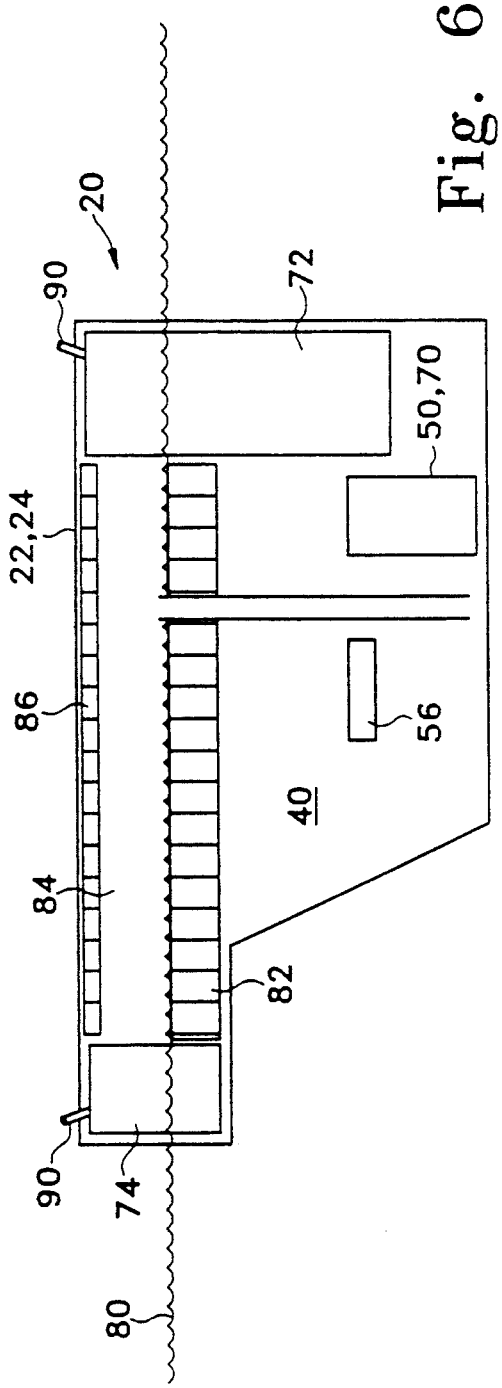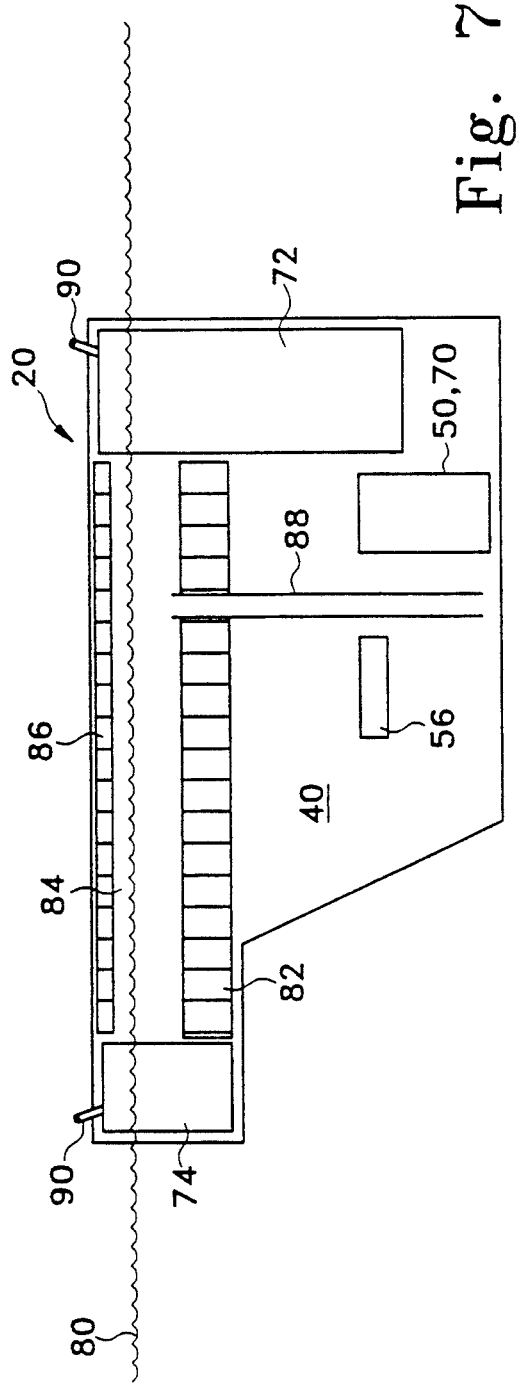

OIL SPILL SKIMMER AND PROCESSOR

This is a continuation of co-pending application Ser. No. 663,720 filed on Mar. 4, 1991.

BACKGROUND OF THE INVENTION

The invention in concerned with oil spill recovery, and in particular the invention relates to large scale, offshore oil spill skimming equipment capable of high volume recovery at virtually 100% oil delivery, and with provision for handling debris encountered with the oil.

Skimmer barges for oil spill recovery have been known. U.S. Pat. No. 3,708,070 of Edwin A. Bell, assigned to Cities Service Oil Co., disclosed a floating oil skimmer barge for still water use (not off-shoe use), having a series of compartments separated by floating baffles or weirs. Inflow to each compartment occurred over one of the floating weirs, with the position of each weir controlled by pumping of water at controlled rates from the bottom of the compartment, to establish a flow between compartments. The concentration of oil was said to increase as the oil/water mixture flowed over each successive floating weir, ultimately to an oil recovery chamber near the rear of the vessel.

The Bell patent did not disclose or recognize benefits of control features of such a floating oil recovery barge, or the need to prevent or discourage laminar flow aboard the vessel in order to aid separation. These and other features are included in the offshore oil spill skimming apparatus of the present invention.

SUMMARY OF THE INVENTION

In accordance with the present invention, an oil spill skimmer vessel, preferably a large scale, continuous separation skimmer suitable for offshore, open ocean use, has a number of control features not found in prior skimmer apparatus, as well as the ability to handle debris entering the skimmer and to keep the debris from entering the oil recovery process. The skimmer apparatus of the invention is capable of delivering nearly 100% oil as recovered from an oil spill, at high volume.

In preferred embodiments the oil skimmer vessel is controlled by a trained operator, with control of height and attitude of the vessel in the water, discharge pumping rate for oil and for water, separately, steering of debris and of incoming oil using water jets, flushing of caught debris, and other features.

In one preferred embodiment of the invention, an ocean-going oil skimmer vessel for recovering oil spills includes a vessel body with a front or inlet end and flotation means for preventing sinking even when the vessel is substantially full of water.

A first floating weir adjacent to the inlet end of the skimmer vessel receives liquid from the surrounding open water outside the vessel, which liquid may contain oil and water, and skims a surface portion of the liquid to flow over the weir.

A main liquid sump is downstream of the first weir means, having a depth extending substantially to the bottom of the skimmer vessel, and such that a liquid surface in the sump lies a short distance below a tip of the first weir. In the main sump separation of oil from water takes place.

A liquid eductor means is provided for withdrawing liquid, virtually all water, from the main liquid sump and for returning it to the body of water surrounding the skimmer vessel. To aid in separation in the main sump, means are included in the sump for discouraging laminar flow of water and oil.

A second weir is at the downstream end of the liquid surface in the main sump, positioned to skim a surface layer of liquid from the liquid sump, the surface layer comprising substantially all oil when oil is present in the sump. A product outlet means removes the material flowing over the second weir means, and includes discharge pump means for withdrawing the material and delivering it out of the vessel toward another location. The vessel body includes a plurality of ballast tanks in the vessel body, with ballast control mean for selectively adjusting volumes of water in the ballast tanks so as to enable control of the height and attitude of the skimmer vessel. There may be two fore ballast tanks and two aft ballast tanks, the latter being much larger and extending lower in the vessel.

Debris handling is an important feature in a preferred embodiment of the skimmer vessel. This includes a debris grate below the surface of the sump liquid, for preventing heavy articles of debris from sinking down into the sump and for promoting the movement of these articles over the second weir. Over the second weir, in an oil holding reservoir or oil sump, a grinder reduces the debris to a relatively small particle size for discharge out of the reservoir along with the oil.

A further preferred feature is a conditioning liquid injector, optimally positioned just downstream of the second weir, so that conditioning liquid (such as diesel fuel or other thinner, a dye, bacteria or an emulsion breaker) is mixed with the oil just upstream of the debris grinder. The grinder thus aids greatly in blending the conditioning liquid with the oil. If the conditioning liquid is a thinner, the thinner is fully blended to effectively thin heavy oils (such as tar balls) for removal from the vessel by the discharge pump. If the liquid is an emulsion breaker, the grinder thoroughly mixes it, and the emulsion breaker works more efficiently on the oil after it has been pumped into holding tanks on the spill recovery vessel.

The liquid eductor pump preferably delivers the bottom sump liquid (substantially all water) out of the vessel at its front end, adjacent to the inlet. In this way, any oil which remains in the sump water can be cycled through the skimmer device a second time, for a higher rate of oil removal and to keep contaminated water in the system.

The first weir of the skimmer apparatus has sufficient flotation to support it high enough to cause the liquid flowing over the weir to assume hyper-critical velocity. Thus, the oil and water mixture will flow downward after the first weir, allowing a separation to occur inside the sump so that only the oil will rise up to the sump area to be drawn off by the second weir. This flow diversion breaks up laminar flow, preventing the oil and water from flowing together toward and over the second weir.

The vertical positioning, i.e. the relative heights of the two weirs, takes into consideration that the first weir will cause the liquid level in the sump to drop below that of the surrounding, outside liquid proportional to the amount of liquid being pumped by both the front and rear weir pumps (the water eductor pump and the oil discharge pump, respectively). Consequently, the operating range of the second weir must be fashioned so that its range of operation covers both the level of the surrounding, outside liquid and the level in the sump after the first weir has lowered it. This enables the apparatus to accommodate operation wherein a heavy layer of oil lies on the surrounding water, and 100% oil flows into the vessel for an initial period of skimming.

An upper deck of the skimmer vessel extends across the rear and at both sides. The upper deck surface is sloped downwardly such that oily waves crashing onto the deck will principally run down into the sump. A splash plate is preferably provided, extending over the second weir from the rear deck, so that any splashed water will be diverted from entering the second, oil sump and will instead go to the first sump for separation. The splash plate, preferably removable so that it can be rigged as sea conditions demand, may be sloped similarly to the adjacent deck.

The ballast tanks allow the attitude of the skimmer to be adjusted in the water so that the most advantageous deck profile is presented to the particular wind-wave situation of the moment. The operating rang of both of the weirs is such that they will operate when the ballast tanks have altered the attitude of the skimmer.

The shape of the skimmer vessel is such that in large waves it may be positioned "backward". This allows the portion which is normally considered the back end to face the large on-coming waves as a wall which may be about 4.5 feet high and about 9 feet wide, with a mass preferably of about 5 tons behind it. The waves lose considerable energy against the wall and the oil works its way around the skimmer to be skimmed in the normal manner, but in the sheltered lee of the wall. This refers to a preferred embodiment wherein the skimmer vessel is about 9 feet long by 9 feet wide by 4.5 feet high.

The flotation of the skimmer is somewhat complicated. When the skimmer is "at rest", i.e. no fluid being pumped over either weir, it is preferably floated by a block of closed cell polyurethane foam which displaces just enough to compensate for the weight of the unit an the equipment in it. If it is assumed for the moment that the ballast tanks each have a hole in the top and in the bottom, they would fill to the float line and have no part in the equation. Thus at rest the skimmer unit barely floats, supported by the block of foam (foam is chosen so that if there were an accidental breaching of a portion of skin, the foam would still maintain floatability and one would not lose the unit).

Now it should be assumed that the input to the ballast tanks is closed off so that by filling or draining them they can influence the flotation of the unit. Above the water line there are two more chambers to consider. The first is a "leaky" hollow which has an open conduit between it and the lower portion of the skimmer. Above this is a second layer of foam.

Now if one or both of the weir pumps starts to work, their operation will cause the level in the sump behind their respective weirs to drop, thus tending to cause the entire body to rise out of the water. Since the foam is stable and the ballast tanks and foam exceed the area of the sump the unit is "held down" in the water because there is not enough flotation generated in the sump void space to elevate the tanks and foam. The ratio in this unit is about four to one, thus the fluid in the sump can drop about four inches and the body will only rise one.

Next consider the draining of the ballast tanks. The front tanks have little water in them as they are not very deep, and so as they are drained they have little effect on the attitude of the skimmer (if they could raise the front end high it would starve the front weir). The rear tanks, however, do extend a few feet into the water and so when emptied they will create several pounds of displacement so they can raise the rear end about 8 inches high. This adjusts the wave meeting attitude.

One particularly novel and important feature of the flotation concerns what happens when the ballast tanks are filled. The unit will gain weight and when the tanks have been filled about three inches, the foam layer is entirely submerged. Thus as the tanks fill further the entire unit is supported only by the four pockets of air in the ballast tanks, and the skimmer is at that time "weightless". This allows the operator to raise and lower it quickly because only a few gallons of space remain in the ballast tanks. The "leaky" space presents no barrier because it stays filled at water level due to the free passage of water through the conduit and air through the vent for this space.

The ability of the ballast tanks to sink the unit as they are filling will continue until the top layer of foam begins to be submerged. As it submerges it will begin to displace water and this will provide additional flotation so that the unit cannot be sunk by the operator.

The practical application of this configuration is that the unit can be controlled rather quickly by the operator to adjust for waves, duck under large debris, clear debris jams, or in case of an oil slick fire, submerge and avoid destruction of the unit.

The skimmer separates oil and water simply by gravity, but the skimmer is designed to enhance gravity separation in a moving environment, the open sea. First, mass is provided to inhibit the tossing motion of the waves; all open areas of the skimmer are flooded save the foam areas. This creates about 5 tons of mass, in a preferred embodiment, to help stability. At least about two tons mass should be provided, even in a relatively smaller unit. Secondly, fluid (water) is pumped out of the skimmer from a pump intake situated in the lower rear end of the skimmer so that as fluid comes in over the top of the first (front) weir it must travel to the far end of the skimmer for release, and the oil thus has time to float up and separate. Thirdly, the size of the skimmer is purposely made large in comparison to the pumping rates in order to slow the velocity and to provide retention time. With the water pump (or eductor pump) going full speed it will take four minutes to change the fluid in the skimmer, and this is time for most of the oil to separate out. In practice, since oil will be pumped out as well a normal retention time will be 10 to 20 minutes for the water. Finally, the design of the skimmer and separator packets in the main liquid sump break the "free surface" area so that laminar flow cannot be supported. The packets may comprise cells of hex shaped aluminum forms (like a honey comb), approximately 7.5 inches deep. This causes oil to separate in these "still zones", even in the presence of wave motion.

A further preferred feature is a bumper strip running along the water line. This gives the operator a visual reference as to how deep (or high) the unit is floating in the water, providing him a gauge to tell how much oil has accumulated in the unit, since the unit is lighter with oil than with water. Further visual indicators (discussed below) show the operator when each ballast tank has been filled and when the ballast tanks have been emptied.

It is therefore among the objects of the invention to greatly improve over prior oil spill skimmer technology, particularly in large ocean-going skimmer vessels, with an efficient vessel apparatus and system for removing oil from water at nearly 100% recovery, at high throughput, and with a large degree of operator control for efficient operation under various conditions. These and other objects, advantages and features of the invention will be apparent from the following description of preferred embodiments, considered along with the accompanying drawings.

DESCRIPTION OF THE DRAWINGS

FIGS. 6 and 7 are schematic elevation views of the oil recovery skimmer vessel, at different levels of submergence in the surrounding water, demonstrating the use of ballast tanks.

DESCRIPTION OF PREFERRED EMBODIMENTS

Figure 1:
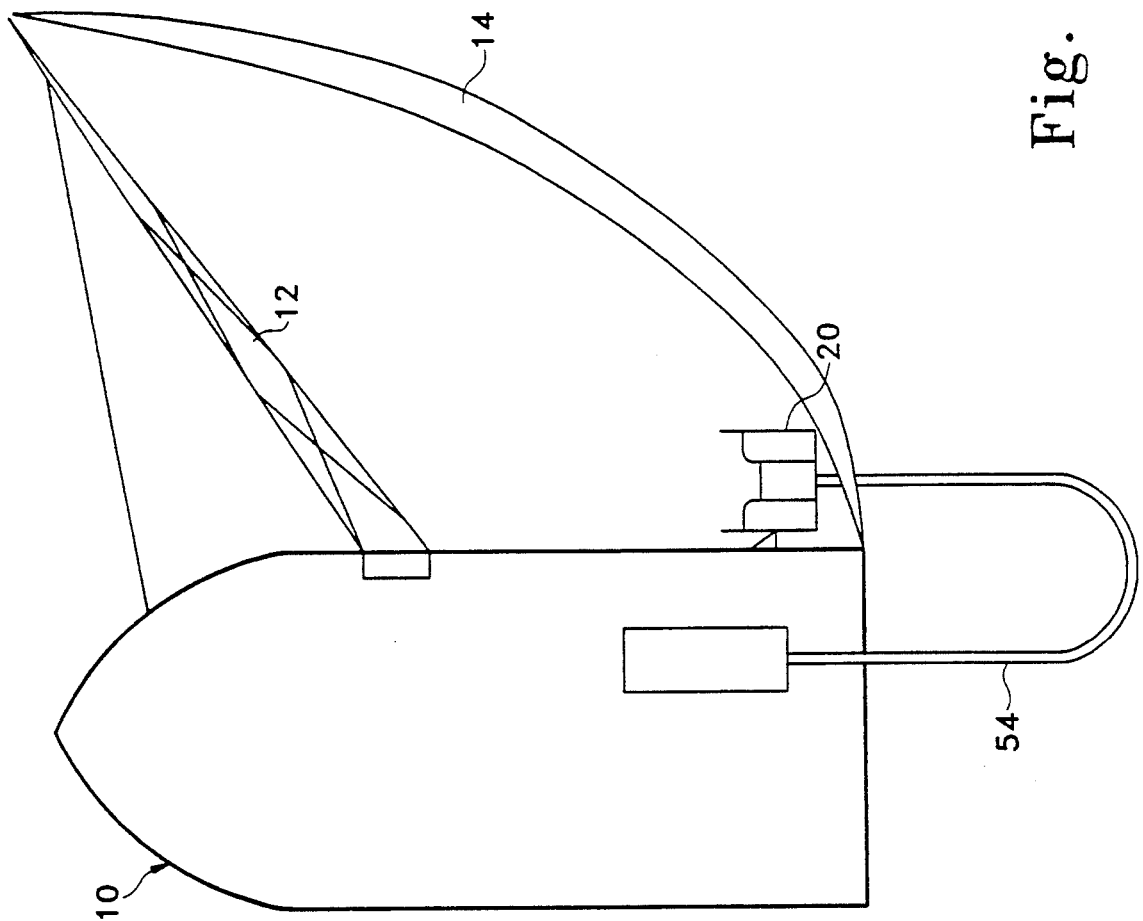
FIG. 1 is a schematic overall plan view, showing the location of an oil recovery skimmer vessel adjacent to a spill recovery vessel and with an oil boom located adjacent to the skimmer.

In the drawings, FIG. 1 shows a spill recovery vessel (SRV) 10 of the type often used in oil spill recoveries. The SRV 10 has a side boom 12 which positions an oil boom 14 alongside the vessel 10 in such a way as to concentrate surface oil as the vessel 10 progresses slowly forward. FIG. 1 shows the location of an oil spill skimmer apparatus 20 of the invention, adjacent to the SRV and positioned to receive oil as concentrated by the boom 14.

The skimmer apparatus 20 comprises a separate vessel, preferably unpowered, with capability of use in the open ocean, in relatively rough conditions. Although its use in the configuration shown in FIG. 1 is preferred, between a boom 14 and the SRV 10 and towed by the SRV, it may be also be used in other configurations. One alternative configuration preferred by some SRV captains is with the skimmer vessel 20 reversed, with back end forward. This assures that an oil conduit 54 (discussed further below) will not come near the SRV's propeller's. Orientation within the boom-enveloped area is not particularly important because there is always a flow into the skimmer as long as oil and water pumps are operating.

Figure 2:
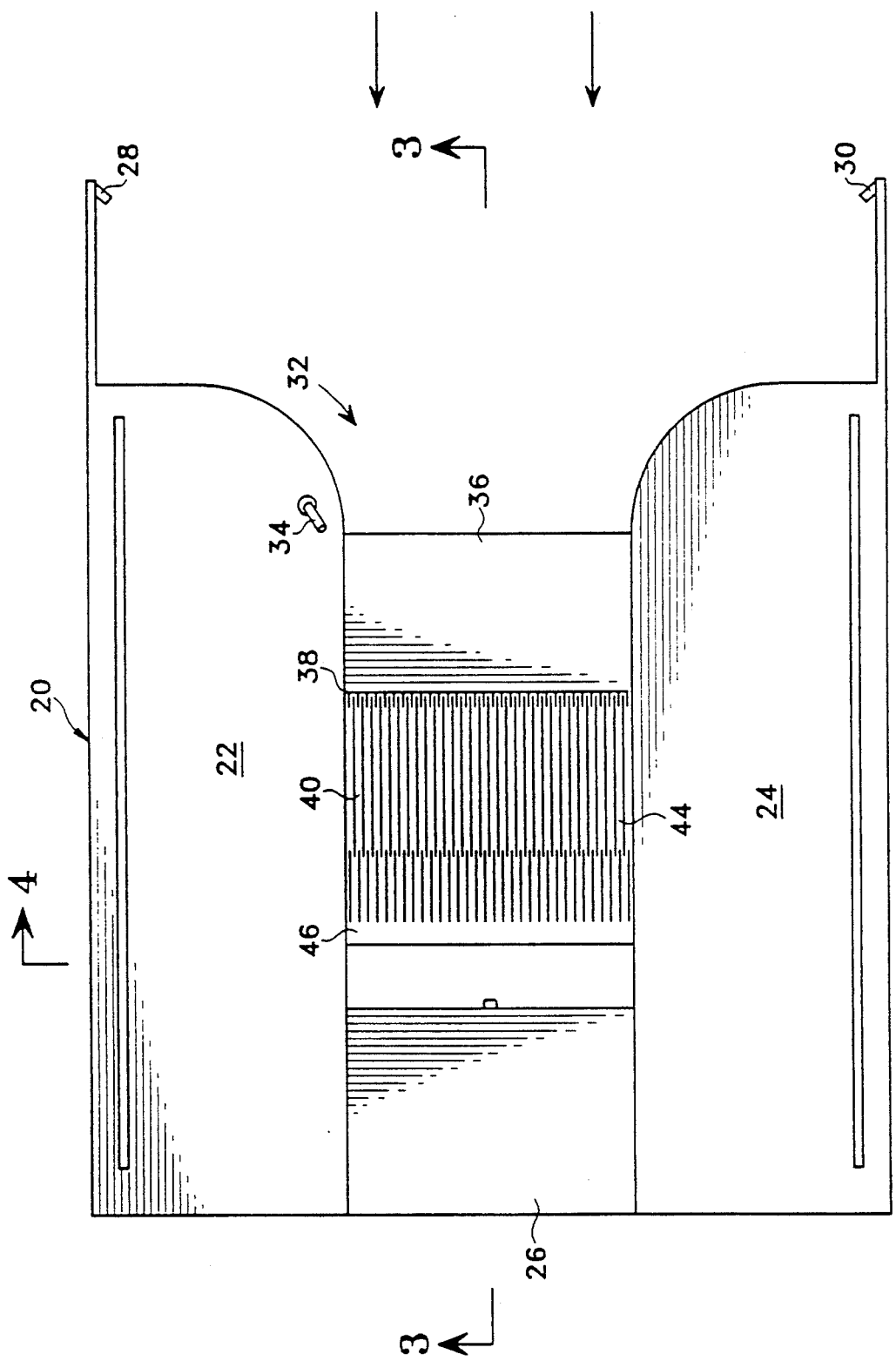
FIG. 2 is a plan view of the skimmer vessel of the invention.

FIG. 2 shows the oil recovery skimmer vessel 20 in plan view, in a preferred embodiment. The vessel preferably includes a left side deck 22, a right side deck 24 and a rear deck 26, each of which is inclined downwardly toward the interior of the vessel as discussed above. At the front of the skimmer vessel 20 are water jets 28 and 30 each of which may represent multiple water jets on each side, for helping direct oil toward an inlet end 32 of the apparatus. The water jets 28 and 30 preferably are adjustable in such a way so as to enable the operator to steer the inflow of oil toward the inlet of the skimmer vessel, with the operator preferably positioned on the SRV. In a preferred embodiment, several jets are at each position 28 and 30, with each being manually adjustable to spray in a different direction. Controls enable the operator to select between adjacent water jets in order to selectively and properly steer the oil inflow during skimming. One or more further water jets 34 may be included adjacent to the inlet 32, also preferably adjustable so as to in effect be steerable in the sense described above. This enables the operator to direct incoming debris in such a way that it will not hinder the oil recovery process.

The skimmer vessel 20 has a first floating, hinged weir or attractor 36 over which oil, water and debris flow toward the interior of the vessel. The floating weir has a weir tip 38 which establishes a skimming flow of the liquid over the weir, so that the skimmed liquid cascades down a short distance to a main sump 40 downstream of the weir 36 (FIG. 3 more clearly shows the skimming flow, with the liquid surface 41 outside and inside the skimmer vessel 20). The hinged weir 36 is of low mass in a preferred embodiment.

The main sump 40 is a separation sump and occupies a large volume of the skimmer vessel 20. Within the main sump 40 laminar flow of liquid is discouraged and substantially prevented. The liquid flowing over the first weir tip 38 generally comprises mostly oil, and as the skimmed water and oil drop down over the first weir, this flow free-falls toward the sump so as to provide a diversion of flow which causes separation in the sump.

Figure 5:
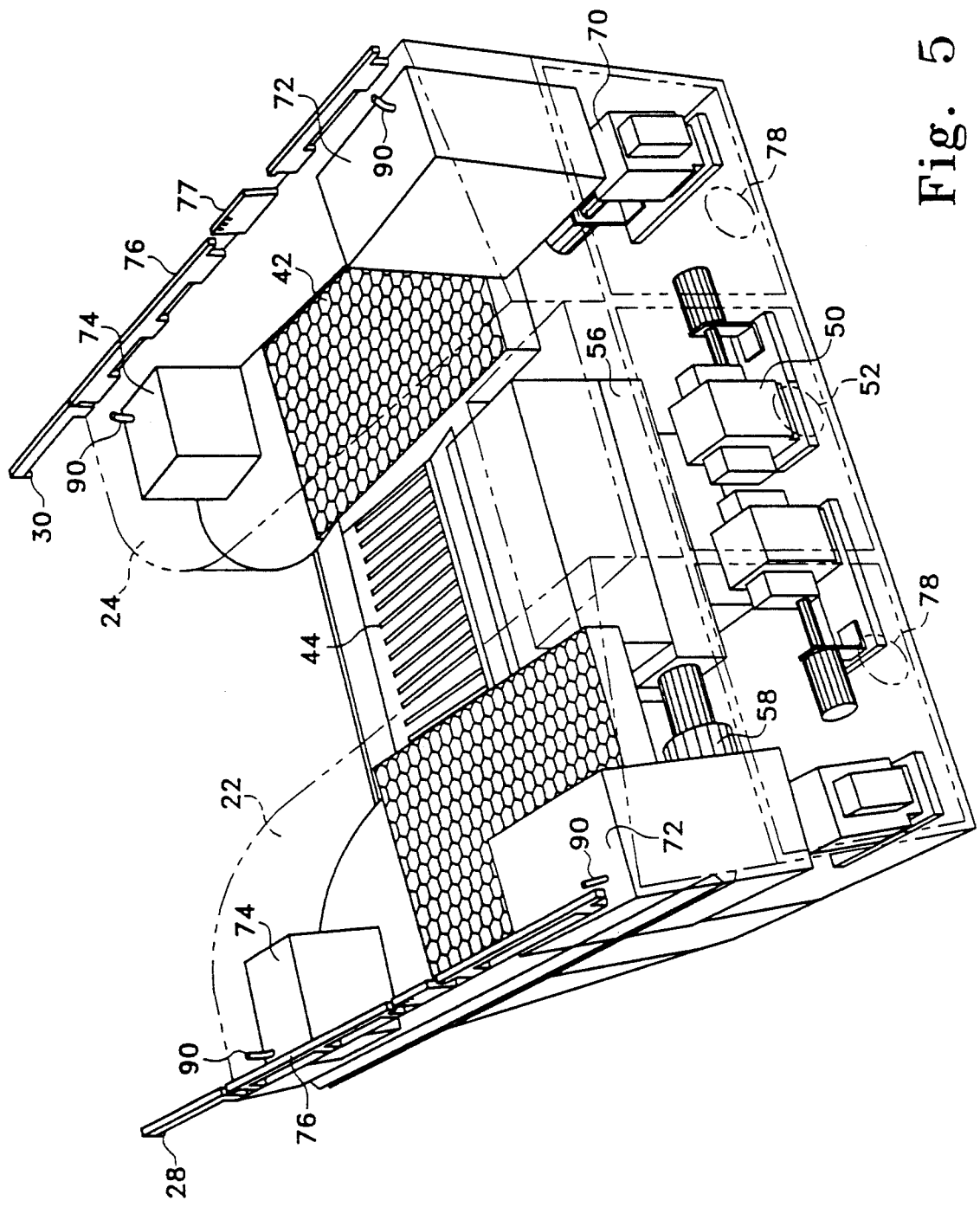
FIG. 5 is a perspective view of the oil recovery skimmer, somewhat schematic and with some surfaces broken away and showing only their outlines, to reveal interior components.

To prevent laminar flow during side to side or fore-/aft sloshing of the vessel due to the motion of the sea, several separator components 42 are provided in the sump. These separator components 42, as shown in FIG. 5, lie beneath the liquid surface in the sump and may comprise series or gangs of hexagonal, vertically oriented tubes, forming a honeycomb-like structure. This stills the liquid during sloshing and prevents laminar flow, encouraging separation by gravity of the oil and water.

Figure 3:
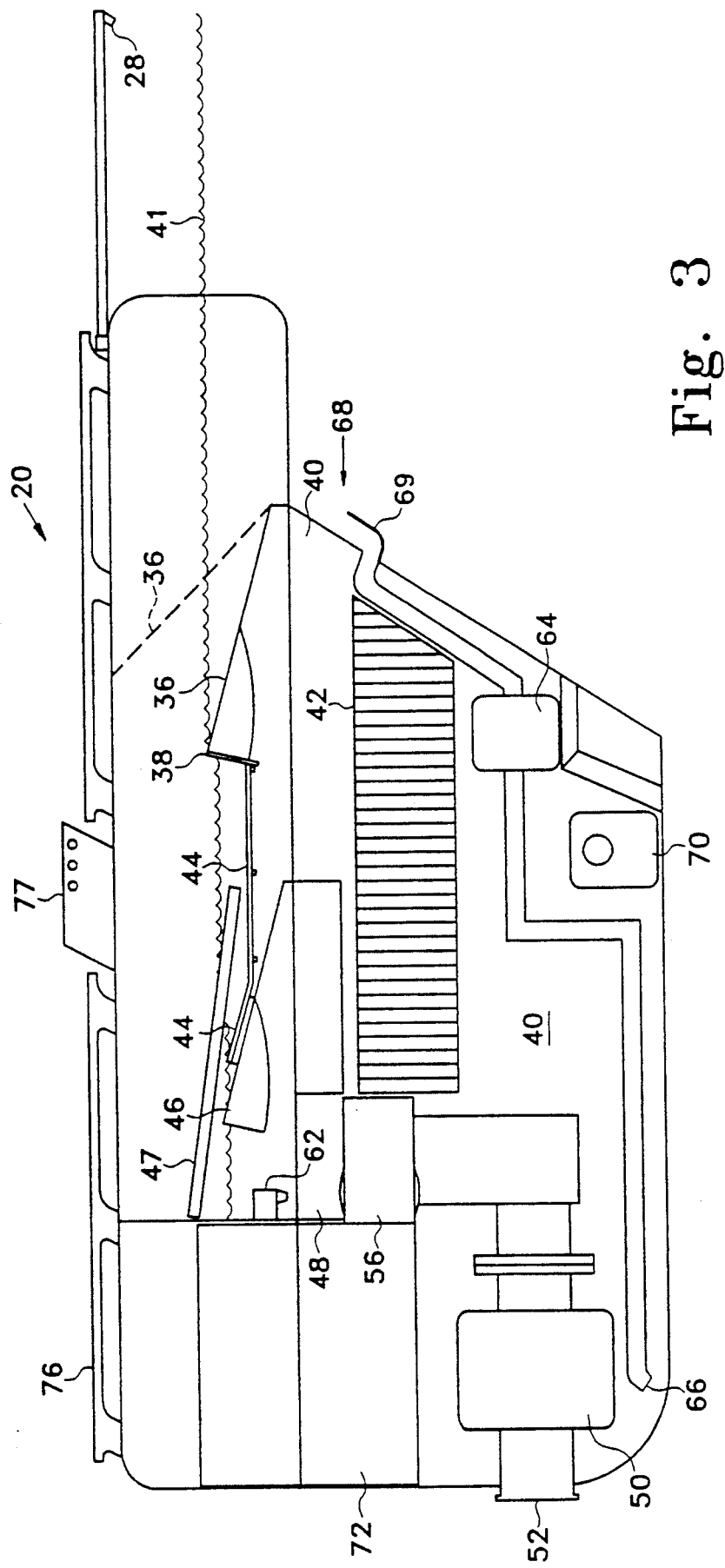
FIG. 3 is a sectional longitudinal elevation view of the oil skimmer apparatus, generally as seen along the line 3—3 in FIG. 2.

A grate 44 is preferably positioned over the main sump, as shown particularly in FIGS. 2, 3 and 5. This debris grate or debris shuttle 44 also beneath the liquid surface in the sump, prevents debris from entering the main or separation sump 40 and encourages the debris to continue flowing rearwardly, over a second or rear hinged, floating weir 46 (also preferably of low mass). As indicated in FIGS. 2 and 3, the debris grate 44 may angle upwardly toward the rear, to prevent interference with the operation of the second weir 46 as much as possible.

The second weir 46 operates at a liquid level lower than the first weir 36, which operates at a level slightly lower than the ocean or other surrounding body of water. The tip of the second floating weir 46 operates at a level slightly lower than that of the sump liquid, providing a skimming function which removes only a surface layer of the liquid in the sump.

The main or separation sump 40 establishes a long dwell time for the liquid entering the sump over the weir 36, and otherwise provides optimum conditions for separation of the oil from the water as discussed above. Thus, substantially only oil flows over the second weir 46, into an oil reservoir or oil sump 48 downstream. The floating weir 46 floats in the oil contained in this oil sump 48.

The vessel preferably may be rigged with a splash plate 47, schematically indicated in FIG. 3, when sea conditions demand. When sea waves are splashing over the decks, it is important that this water not enter the oil sump 48 but instead be diverted to the main or separation sump 40. The splash plate 47 may have a slope similar to that of the rear deck (FIG. 2), and may serve as a continuation of the same surface. In heavy seas where the splash plate is needed, generally there is not a lot of debris entering the skimmer vessel. However, even with much debris present, the skimmer may be operated in the configuration shown, i.e. with the splash plate 47 rigged. The splash plate can provide a ramp over which debris will move toward the back of the vessel, rather than entering the oil sump 48, and it can be caught in a net at the rear of the vessel, for example.

The oil sump 48 is evacuated by a discharge pump 50, via a product output 52 (preferably about 6 inch diameter) to which is connected a conduit or hose 54 as shown in FIG. 1, to deliver the recovered oil to be stored aboard the SRV 10.

As discussed previously, debris is encouraged by the upstream structure to flow over the second weir 46 (in the absence of the splash plate 47), along with the oil. In the oil sump 48, the debris encounters a debris grinder 56 of sufficient power to grind the debris into relatively small particles so that they can be delivered from the skimmer along with the oil, by the product discharge pump 50.

Figure 4:
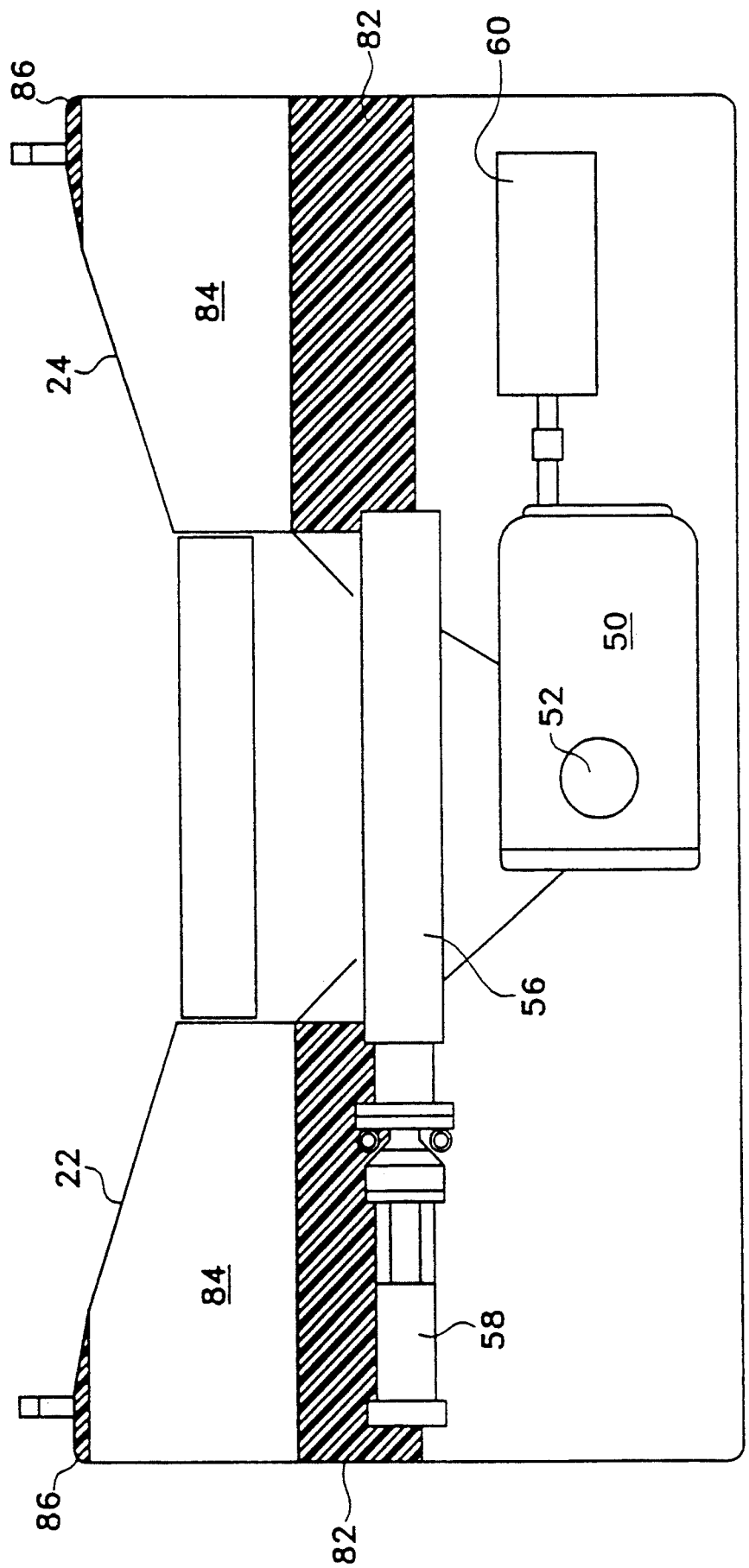
FIG. 4 is a transverse sectional view of the oil skimmer apparatus, generally as seen along the line 4-4 in FIG. 2.

The location of the debris grinder 56 is better seen with reference to FIGS. 4 and 5. The debris grinder is a rotary device with active rotational elements, preferably powered by a hydraulic driver 58. The oil discharge pump 50 is also preferably driven by a hydraulic driver 60, as indicated in FIG. 4. An important feature of the apparatus is that the debris grinder and its location cooperate with an injector 62 for conditioning liquid, such as diesel fuel as a thinner, an emulsion breaker, dye, etc. The conditioning liquid injector 62 delivers the conditioning liquid into the oil in the oil sump 48 just downstream of the second weir or oil skimmer weir 46. The conditioning liquid is thus thoroughly blended with the skimmed oil, including heavy oil such as tar balls, in a way which would not be possible without a good mixing agitation. Without the mixing action of the debris grinder, for example an injected thinning liquid would not break down heavy oils such as tar balls, but would only serve generally to lubricate the flow of sticky oil in skimmer channels and to provide a coating on the channel surfaces, as such surfaces or diluent products have been used previously.

While recovered oil is being evacuated from the vessel 20 via the product outlet 52, water is being withdrawn from the main or separator sump 40 and returned to the sea or other surrounding water. This is effected using an eductor pump 64, which may be located at a submerged position in the sump 40 as shown in FIG. 3. An input 66 to the eductor pump is located preferably at the bottom rear of the main sump, as shown in FIG. 3. Its discharge 68 preferably is located at a forward position, just below the inlet to the skimmer vessel, and may have a baffle plate 69 to inhibit laminar flow. This enables water having small quantities of oil remaining to be put through the skimmer system a second time. The eductor pump 64 preferably is driven hydraulically, in parallel with the oil discharge pump 50.

FIG. 3 also indicates a pressure service pump 70, the purpose of which is to deliver sea water into and out of the ballast tanks of the vessel (removal of the ballast water is accomplished with a venturi as discussed below), and also to provide sea water for the water jets shown in FIG. 2.

The ballast tanks are shown in FIG. 5, preferably including a pair of aft ballast tanks 72 and a pair of smaller forward ballast tanks 74. FIG. 3 also shows the aft ballast tanks 72, but not the fore tanks 74. The function of these ballast tanks, in preferred embodiments of apparatus and methods of use of the invention, is described above. FIG. 5 also indicates the pressure service pump 70 (its location is not critical), and shows side rails 76 at the side decks 22 and 24. The surfaces of the decks 22 and 24 are shown removed and the deck structures are only outlined in FIG. 5, to indicate positions of interior components. FIG. 5 also shows a pair of top lift pads 77 (a right lift pad being fairly visible) for lifting and maneuvering the vessel, one of which is also shown in FIG. 3. These lift pads 77 are secured to structural bracing within the vessel.

Another preferred feature of the invention, not shown in the drawings, is that a lift pad preferably is provided on one or both sides of the vessel, also securely tied to internal bracing. This enables an operator from the SRV to lift the skimmer vessel off the SRV and lower it to the water, in a rotated orientation such that the lifting point is much closer to the SRV, putting less strain on the SRV's winch.

FIG. 5 also shows a pair of rear openings 78 in the skimmer vessel, into which emergency drains are fitted. These emergency drains act as relief valves which enable liquid inside the vessel to be released to the surrounding sea if a power failure is encountered. The vessel when operable may weigh five tons or more, and if the skimmer vessel's pumps are not operable, liquid needs to be drained in order for the SRV to lift it. The emergency drains can have very low "crack" pressure, such as about 6 inches of water head, so that liquid begins to be drained from the skimmer vessel when it is lifted a short distance by the SRV's winch.

Another important feature in a preferred embodiment of the invention is that the eductor pump 64 is reversible (preferably also the product discharge pump 50). If heavy debris is encountered, and the debris cannot be manipulated using water jets or other measures, it can be flushed over the back end of the vessel 20. Reversal of the eductor pump 64 will bring sea water into the separator sump and will cause some liquid to flood upwardly, lifting the first weir pivotally upwardly to a stop position (see dashed line in FIG. 3) and thus causing the sump liquid to flush backwardly over the rear deck of the vessel. In some cases the product discharge pump 50 will also be reversed to dislodge debris.

FIGS. 6 and 7 schematically show the skimmer unit of the invention at different levels in the water, i.e relative to the water surface 80. In FIG. 6 the skimmer 20 is in a "rest" position, with a main foam layer 82 generally just below the surface. The position shown in FIG. 6 can be an approximate operating position of the skimmer unit 20. When the main foam layer 82 is just below the surface it is affording the maximum buoyancy of which it is capable (except that some foam, in a much smaller cross section, may extend somewhat higher in order to provide a continuing small increase in buoyancy as the unit sinks further below the position shown in FIG. 6). The operating position of FIG. 6 may be easily achieved by opening the rear and front ballast tanks 72 and 74 to take in sea water to the level shown.

The space 84 above the main foam layer 82 and below an upper foam layer 86 acts as a structural cavity of the vessel. The side decks 22, 24 are just above the upper foam layer 86, and these foam layers are both located at the sides of the vessel.

FIG. 7 shows the skimmer vessel at a partially submerged position, lower than that of FIG. 6. Control of the vessel's level is achieved using the ballast tanks 72 and 74. Because of the configuration of the vessel, a relatively low volume of water interchange is required to shift the vessel's level, and these changes can be accomplished very quickly. The structural void 84 is an important feature, in that if this space were entirely occupied by foam, the ability of the ballast tanks, particularly the smaller front ballast tanks 74, to control the level and attitude of the vessel would be greatly reduced or eliminated. Further, an internal conduit 88 provides a constant connection between clean water at the bottom of the main sump 40 and the void space 84, which is located below the splash decks at the sides of the vessel (see FIG. 4). This enables free flow of water into and out of the void space with the change of altitude of the vessel, thus essentially making the void space 84 "neutral". This eliminates the need to flood and evacuate the considerable volume of space 84 whenever the attitude or altitude of the skimmer vessel need to be adjusted. Thus, the ballast tanks 74 and 72 can effect attitude and altitude changes with relatively low volume of water interchange.

The top foam layer 86, preferably of much lesser volume than the main foam layer 82, serves to prevent the vessel from sinking, particularly in the event of operator error. All of the ballast tanks 72 and 74 are vented at their upper ends, as by vents 90 indicated in FIGS. 6 and 7 (and FIG. 5), with these vents in view of the operator. This gives the operator a visual indication when the ballast tanks are full.

Figure 8:
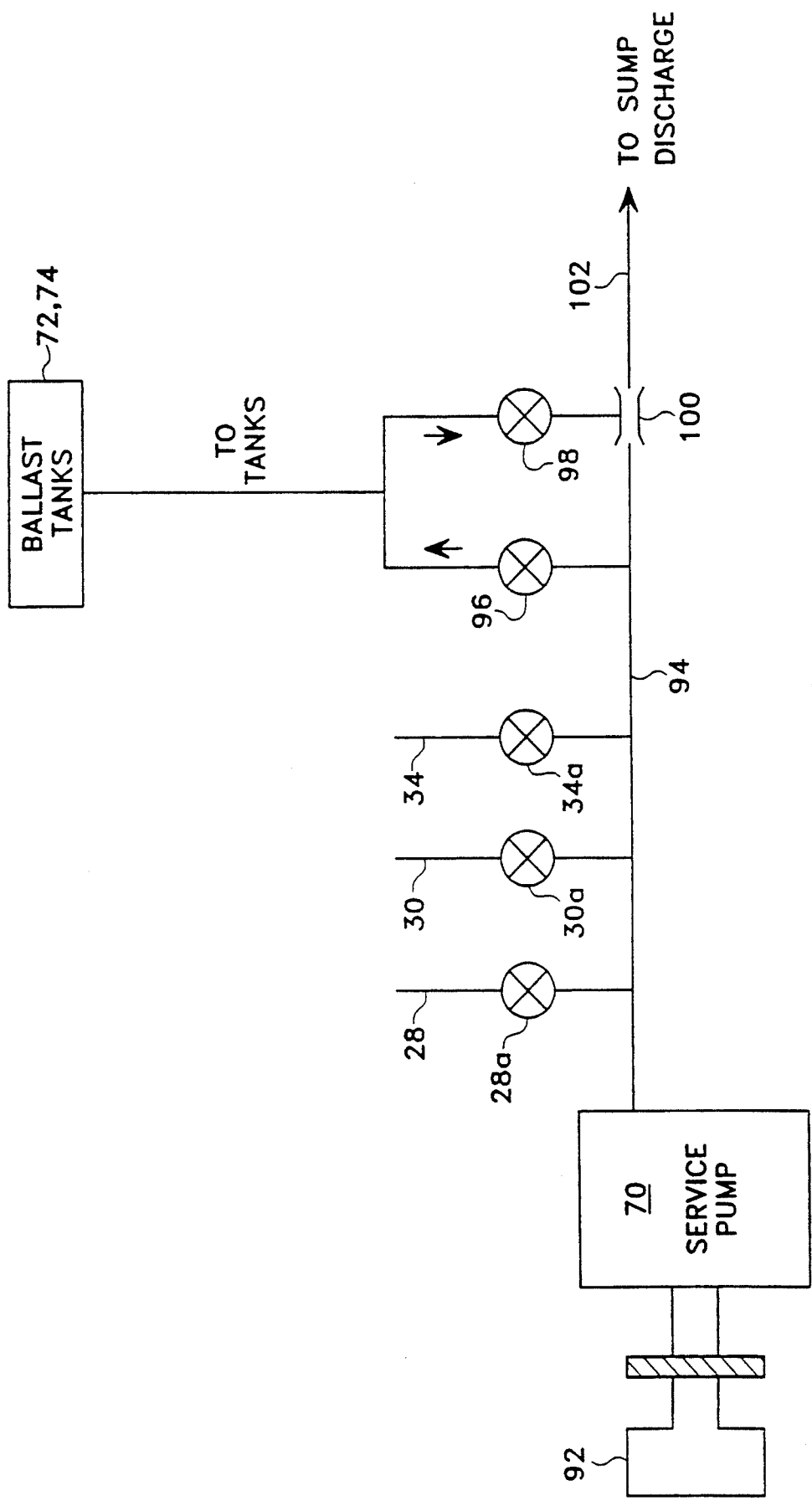
FIG. 8 is a schematic diagram showing pump, line and valve connections in one aspect of the invention.

FIG. 8 is a schematic indication of the service pump 70 and its connection to the ballast tanks 72, 74 as well as to water jets 28, 30 and 34. The service pump 70 has a sea water intake indicated at 92. Normally the service pump will be active continuously, for the purpose of delivering water to the jets 28, 30 and 34. It is important that the delivery of water to the jets not be interrupted. The jets are shown with control valves 28a, 30a and 34a, for controlling activation of the various jets. A pressurized water delivery line 94 is also shown connected to the ballast tanks 72, 74 via a tank supply valve 96. This valve is opened whenever the tanks are to be filled.

When the tanks are to be evacuated, the valve 96 (actually representing four different valves, one for each tank) is closed and a valve 98 is opened, allowing a venturi 100 in the delivery line 94 to draw water from the ballast tanks. Some water from the line 94 is continually being discharged to the main sump at low volume, through a discharge end 102. Electronics associated with the valve controls for the valves 28a, 30a, 34a, 96 and 98 sense the positions of these valves and increase the power to the service pump 70 as needed. If all valves are closed, the pump 70 is inactive and there is no water discharged to the sump.

Further, when the valve 98 is open and the venturi is operative to withdraw water from the ballast tanks, a visual indication is provided to the operator when the tanks are dry. Air bubbles from the venturi will be discharged at 102 (along with discharge water) and these bubbles are visible to the operator at the surface of the sump.

The above described preferred embodiments are intended to illustrate the principles of the invention, but not to limit its scope. Other embodiments and variations to this preferred embodiment will be apparent to those skilled in the art and may be made without departing from the spirit and scope of the invention as defined in the following claims.

I claim:

1. An offshore oil spill skimmer vessel for removing oil from the surface of water and for separating oil from water taken aboard the vessel, comprising, a vessel body with a front or inlet end and flotation means for preventing sinking even when the vessel is substantially full of water, first floating weir means adjacent to the inlet end of the skimmer vessel, for receiving liquid from the open water outside the vessel, which liquid may contain oil and water, and for skimming a surface portion of the liquid to flow over the weir means, a main liquid sump downstream of the first weir means, having a depth extending substantially down into the skimmer vessel, and such that a liquid surface in the sump lies a short distance below a tip of the first weir means, the first floating weir means having sufficient flotation to support supercritical, laminar flow as the liquid passes over the first floating weir means and into the main liquid sump, thus being self-adjusting to flow rate over the weir means, water eductor means for withdrawing liquid, virtually all water, from the main liquid sump and for returning it to the body of water surrounding the skimmer vessel, including means for withdrawing water at a rate sufficient to keep the sump sufficiently below the surrounding body of water to establish supercritical, laminar flow over the first floating weir means, baffle means in the main liquid sump for stilling the liquid in the sump during sloshing and discouraging laminar flow of water and oil in the liquid sump, second weir means at the downstream end of the liquid surface in the main liquid sump, for skimming a surface layer of liquid from the main liquid sump, the surface layer comprising substantially all oil when oil is present in the liquid sump, and product outlet means for removing the material flowing over the second weir means, including discharge pump means for withdrawing the material and delivering it out of the vessel toward another location.

2. A skimmer vessel according to claim 1, wherein the means for discouraging laminar flow includes a series of vertically oriented tubes submerged in the liquid sump.

3. A skimmer vessel according to claim 1, wherein the liquid sump extends substantially to the bottom of the skimmer vessel and generally to the rear of the vessel.

4. An offshore oil spill skimmer vessel for removing oil from the surface of water and for separating oil from water taken aboard the vessel, comprising, a vessel body with a front or inlet end and flotation means for preventing sinking even when the vessel is substantially full of water, first floating weir means adjacent to the inlet end of the skimmer vessel, for receiving liquid from the open water outside the vessel, which liquid may contain oil and water, and for skimming a surface portion of the liquid to flow over the weir means, a main liquid sump downstream of the first weir means, having a depth extending substantially down into the skimmer vessel, and such that a liquid surface in the sump lies a short distance below a tip of the first weir means, water eductor means for withdrawing liquid, virtually all water, from the main liquid sump and for returning it to the body of water surrounding the skimmer vessel, means in the main liquid sump for discouraging laminar flow of water and oil in the liquid sump, second weir means at the downstream end of the liquid surface in the main liquid sump, for skimming a surface layer of liquid from the main liquid sump, the surface layer comprising substantially all oil when oil is present in the liquid sump, product outlet means for removing the material flowing over the second weir means, including discharge pump means for withdrawing the material and delivering it out of the vessel toward another location, and debris handling means, including means for causing most debris entering the vessel over the first weir means to be conveyed over the second weir means, and debris grinding means downstream of the second weir means, for grinding debris to the extent necessary for the discharge pump means to deliver the debris out of the vessel along with oil.

5. A skimmer vessel according to claim 4, wherein the debris handling means includes a debris grate in the liquid sump, below the surface of the sump liquid and positioned to prevent heavy debris from sinking down into the liquid sump.

6. A skimmer vessel according to claim 4, further including conditioning means for injecting a conditioning liquid into the flow of material just downstream of the second weir means, so as to mix with skimmed oil in a position such that the grinder means helps blend the conditioning liquid with the oil.

7. An offshore oil spill skimmer vessel for removing oil from the surface of water and for separating oil from water taken aboard the vessel, comprising, a vessel body with a front or inlet end and flotation means for preventing sinking even when the vessel is substantially full of water, first floating weir means adjacent to the inlet end of the skimmer vessel, for receiving liquid from the open water outside the vessel, which liquid may contain oil and water, and for skimming a surface portion of the liquid to flow over the weir means, a main liquid sump downstream of the first weir means, having a depth extending substantially down into the skimmer vessel, and such that a liquid surface in the sump lies a short distance below a tip of the first weir means, the first floating weir means having sufficient flotation to support supercritical, laminar flow as the liquid passes over the weir means and into the main liquid sump, thus being self-adjusting to flow rate over the weir means, water eductor means for withdrawing liquid, virtually all water, from the main liquid sump and for returning it to the body of water surrounding the skimmer vessel, the water eductor means including means for maintaining the level of liquid being withdrawn from the main sump below the level of the body of water surrounding the vessel, and the eductor means further including an eductor outlet positioned near the front of the vessel, in a position such that liquid withdrawn from the main sump and delivered back to the open water will mingle with incoming water and oil at the inlet end of the vessel, tending to be cycled through the skimmer vessel again to remove additional oil which may be present in the water exiting the eductor outlet, second weir means at the downstream end of the liquid surface in the main liquid sump, for skimming a surface layer of liquid from the main liquid sump, the surface layer comprising substantially all oil when oil is present in the liquid sump, and product outlet means for removing the material flowing over the second weir means, including discharge pump means for withdrawing the material and delivering it out of the vessel toward another location.

8. An offshore oil spill skimmer vessel for removing oil from the surface of water and for separating oil from water taken aboard the vessel, comprising, a vessel body with a front or inlet end and flotation means for preventing sinking even when the vessel is substantially full of water, first floating weir means adjacent to the inlet end of the skimmer vessel, for receiving liquid from the open water outside the vessel, which liquid may contain oil and water, and for skimming a surface portion of the liquid to flow over the weir means, a main liquid sump downstream of the first weir means, having a depth extending substantially down into the skimmer vessel, and such that a liquid surface in the sump lies a short distance below a tip of the first weir means, water eductor means for withdrawing liquid, virtually all water, from the main liquid sump and for returning it to the body of water surrounding the skimmer vessel, second weir means at the downstream end of the liquid surface in the main liquid sump, for skimming a surface layer of liquid from the main liquid sump, the surface layer comprising substantially all oil when oil is present in the liquid sump, product outlet means for removing the material flowing over the second weir means, including discharge pump means for withdrawing the material and delivering it out of the vessel toward another location, and further including independent ballast means positioned separately fore and aft of the main liquid sump, and wherein the vessel has sufficient mass such that when in an operating configuration with the liquid sump substantially full and with ballast means mostly filled, the vessel's mass maintains the vessel sufficiently low in the water as to maintain the liquid sump level below the surrounding water level and below the tip of the first weir means.

9. A skimmer vessel according to claim 8, wherein the ballast means includes a plurality of ballast tanks in the vessel body, with ballast control means for selectively adjusting volumes of water in the ballast tanks so as to enable control of the height and inclination and attitude of the skimmer vessel.

10. A skimmer vessel according to claim 9, further including fixed, non-adjustable flotation means in the vessel, independent of the integrity of the ballast tanks, sufficient to prevent sinking of the vessel even with all ballast tanks fully flooded.

11. An offshore oil spill skimmer vessel for removing oil from the surface of water and for separating oil from water taken aboard the vessel, comprising, a vessel body with a front or inlet end and flotation means for preventing sinking even when the vessel is substantially full of water, first floating weir means adjacent to the inlet end of the skimmer vessel, for receiving liquid from the open water outside the vessel, which liquid may contain oil and water, and for skimming a surface portion of the liquid to flow over the weir means, a main liquid sump downstream of the first weir means, having a depth extending substantially down into the skimmer vessel, and such that a liquid surface in the sump lies a short distance below a tip of the first weir means, water eductor means for withdrawing liquid, virtually all water, from the main liquid sump and for returning it to the body of water surrounding the skimmer vessel, means in the main liquid sump for discouraging laminar flow of water and oil in the liquid sump, second weir means at the downstream end of the liquid surface in the main liquid sump, for skimming a surface layer of liquid from the main liquid sump, the surface layer comprising substantially all oil when oil is present in the liquid sump, product outlet means for removing the material flowing over the second weir means, including discharge pump means for withdrawing the material and delivering it out of the vessel toward another location, a plurality of ballast tanks in the vessel body, with ballast control means for selectively adjusting volumes of water in the ballast tanks so as to enable control of the height and inclination and attitude of the skimmer vessel, fixed, non-adjustable flotation means in the vessel, sufficient to prevent sinking of the vessel even with all ballast tanks fully flooded, and said fixed, non-adjustable flotation means including a first layer of buoyant foam om each of left and right sides of the vessel, at a level to be essentially just below the surrounding, outside water surface when the vessel is in an operating configuration, said first layer of buoyant foam having a volume somewhat less than sufficient to prevent sinking of the vessel with all ballast tanks fully flooded, whereby the vessel is easily manipulated by addition and evacuation of relatively low volumes of water in the ballast tanks.

12. A skimmer vessel according to claim 11, wherein the fixed, non-adjustable flotation means includes a second layer of buoyant foam in each of left and right sides of the vessels, at a level higher than the first layer and near the top of the vessel, with a volume sufficient to prevent sinking of the vessel with the first layer of buoyant foam submerged and with all ballast tanks fully flooded.

13. An offshore oil spill skimmer vessel for removing oil from the surface of water and for separating oil from water taken aboard the vessel, comprising, a vessel body with a front or inlet end and flotation means for preventing sinking even when the vessel is substantially full of water, first floating weir means adjacent to the inlet end of the skimmer vessel, for receiving liquid from the open water outside the vessel, which liquid may contain oil and water, and for skimming a surface portion of the liquid to flow over the weir means, the first floating weir means having sufficient flotation to support supercritical, laminar flow as the liquid passes over the first floating weir means and into the sump, a main liquid sump downstream of the first weir means, having a depth extending substantially down into the skimmer vessel, and such that a liquid surface in the sump lies a short distance below a tip of the first weir means, water eductor means for withdrawing liquid, virtually all water, from the main liquid sump and for returning it to the body of water surrounding the skimmer vessel, second weir means at the downstream end of the liquid surface in the main liquid sump, for skimming a surface layer of liquid from the main liquid sump, the surface layer comprising substantially all oil when oil is present in the liquid sump, product outlet means for removing the material flowing over the second weir means, including discharge pump means for withdrawing the material and delivering it out of the vessel toward another location, further including a plurality of ballast means in the vessel body, positioned to extend fore and aft of the main liquid sump to prevent substantial vessel altitude changes with changes in liquid level in the main liquid sump, and the combined cross sectional area of the ballast means in a plane parallel to the surrounding body of water being substantially greater than the surface area of the main liquid sump so that changes in the liquid level within the main liquid sump will cause a much smaller change in level of the skimmer vessel in the surrounding body of water.

14. A skimmer vessel according to claim 13, wherein said combined cross sectional area of the ballast tanks is at least about four times the surface area of the main liquid sump.

15. A skimmer vessel according to claim 13, wherein the ballast means includes means for selectively adjusting volumes of water in the ballast tanks so as to enable control of the height and inclination and attitude of the skimmer vessel.

16. A method for operating an offshore oil spill skimmer vessel to remove oil from the surface of water and to separate oil from water taken aboard the vessel, comprising the steps of, providing a vessel body with a front or inlet end and flotation means for preventing sinking even when the vessel is substantially full of water, the vessel including a first floating weir means adjacent to the inlet end of the vessel, for receiving liquid from the open water outside the vessel, which liquid may contain oil and water, and for skimming a surface portion of the liquid to flow over the weir means, providing a main liquid sump downstream of the first weir means, having a depth extending substantially down into the skimmer vessel, providing a second weir means at the downstream end of the liquid surface in the main liquid sump, for skimming a surface layer of liquid from the main liquid sump, which surface layer will comprise substantially all oil when oil is present in the liquid sump, allowing liquid from the open water outside the vessel to flow into the front or inlet end of the vessel and establishing sufficient flotation in the first floating weir means to support supercritical, laminar flow as the liquid passes over the first floating weir means and into the liquid sump, thereby operating the first floating weir means to be self-adjusting to flow rate over the first floating weir means, with the liquid surface in the sump lying a short distance below the tip of the first weir means, withdrawing liquid, virtually all water, from the main liquid sump and returning it to the body of water surrounding the skimmer vessel, and withdrawing the water at a rate sufficient to keep the sump level sufficiently below the surrounding body of water outside the vessel to establish supercritical, laminar flow over the first floating weir means, discouraging laminar flow of water and oil in the liquid sump, removing material flowing over the second weir means with a discharge pump, and delivering the material out of the vessel toward another location.

17. An offshore oil spill skimmer vessel for removing oil from the surface of water and for separating oil from water taken aboard the vessel, comprising, a vessel body with a front or inlet end and flotation means for preventing sinking even when the vessel is substantially full of water, first floating weir means adjacent to the inlet end of the skimmer vessel, for receiving liquid from the open water outside the vessel, which liquid may contain oil and water, and for skimming a surface portion of the liquid to flow over the weir means, a main liquid sump downstream of the first weir means, having a depth extending substantially down into the skimmer vessel, and such that liquid surface in the sump lies a short distance below a tip of the first weir means, the first floating weir means having sufficient flotation to support supercritical, laminar flow as the liquid passes over the first floating weir means and into the main liquid sump through a wide range of liquid flow rates over the first floating weir means, thus being self-adjusting to flow rate over the weir means, water eductor means for withdrawing liquid, virtually all water, from the main liquid sump and for returning it to the body of water surrounding the skimmer vessel, including means for withdrawing water at a rate sufficient to keep the sump sufficiently below the surrounding body of water to establish supercritical, laminar flow over the first floating weir means, second weir means at the downstream end of the liquid surface in the main liquid sump, the surface layer comprising substantially all oil when oil is present in the liquid sump, and product outlet means for removing the material flowing over the second weir means, including discharge pump means for withdrawing the material and delivering it out of the vessel toward another location.

18. The offshore oil spill skimmer vessel of claim 17, wherein the second weir means comprises a second floating weir means downstream of which is an oil sump communicating with said product outlet means, the second floating weir means being positioned to float on the liquid in the oil sump and having sufficient flotation to support supercritical, laminar flow as liquid passes over the second floating weir means and into the oil sump through a wide range of liquid flow rates over the second floating weir means as determined by the discharge pump means, thus being self-adjusting to flow rate over the second weir means.

19. A skimmer vessel according to claim 17, further including thinning means for injecting a thinning liquid into the flow of material just downstream of the second weir means, and blending means with an active rotational element for mixing the thinning liquid with the flow of material, so as to thin heavy oils in the material to be removed from the vessel with the discharge pump means.

20. A skimmer vessel according to claim 17, further including adjustable coherent, vertically plunging water jet means adjacent to the inlet end, for enabling steering of oil masses and debris approaching the first weir means.

* * * * *